Feb. 1, 1944.   S. R. HOWARD   2,340,531
AUTOMATIC WEIGHING MACHINE
Filed May 16, 1941   2 Sheets-Sheet 1
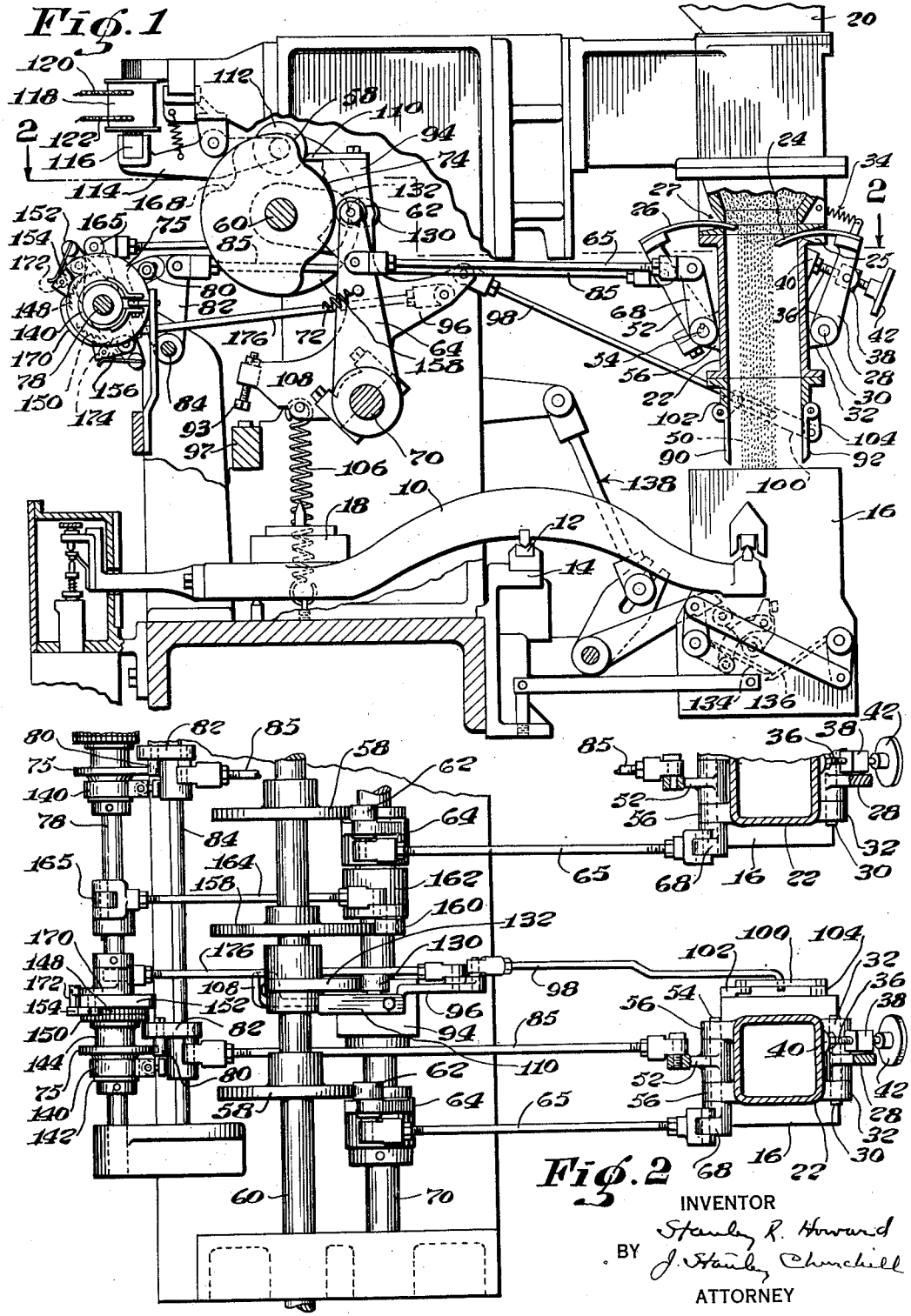
INVENTOR
Stanley R. Howard
BY J. Stanley Churchill
ATTORNEY Feb. 1, 1944. S. R. HOWARD 2,340,531
AUTOMATIC WEIGHING MACHINE
Filed May 16, 1941 2 Sheets-Sheet 2
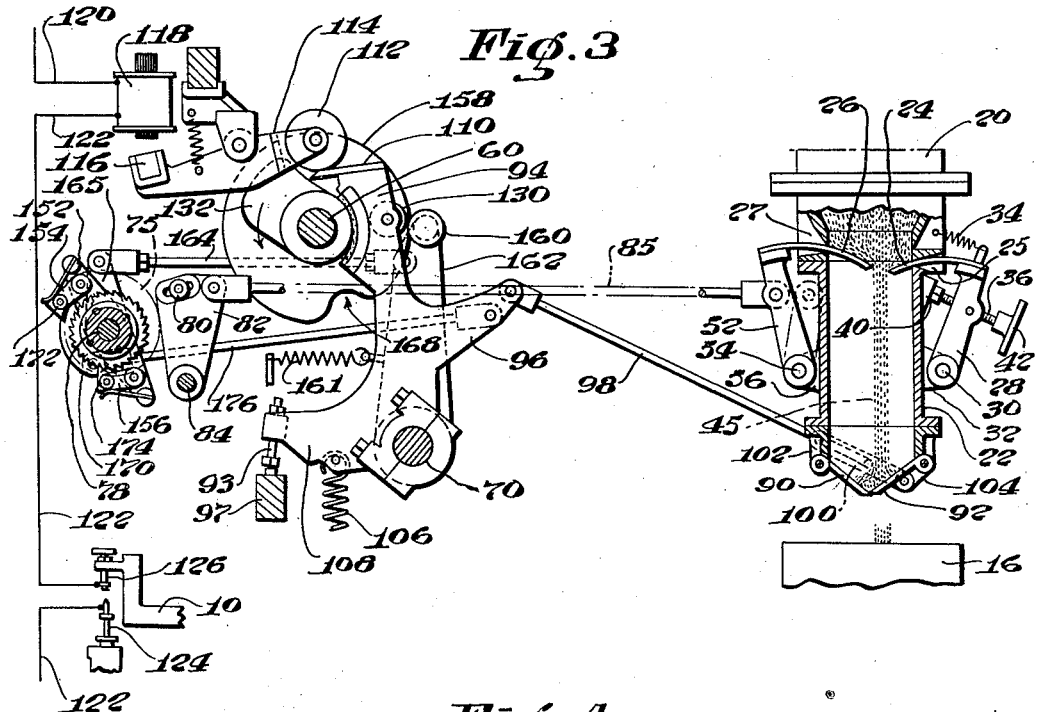
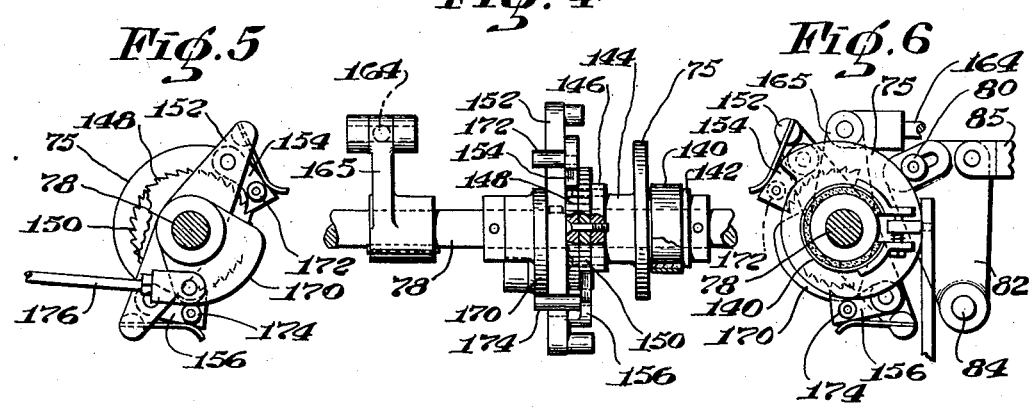
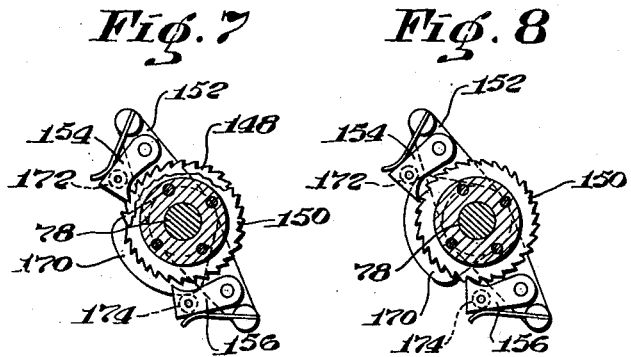
INVENTOR
Stanley R. Howard
BY J. Stanley Churchill
ATTORNEY Patented Feb. 1, 1944

2,340,531

UNITED STATES PATENT OFFICE 2,340,531

AUTOMATIC WEIGHING MACHINE

Stanley R. Howard, Milton, Mass., assignor to Pneumatic Scale Corporation, Limited, Quincy, Mass., a corporation of Massachusetts Application May 16, 1941, Serial No. 393,765

10 Claims. (Cl. 249—2)

This invention relates to an automatic weighing machine.

The invention has for one of its objects to provide a novel and improved automatic weighing machine which is adapted to handle, weigh and package flowable solid material in an efficient, rapid, accurate and economical manner.

A further and more specific object of the invention is to provide a novel weighing machine embodying a scale and material feeding mechanism for forming a load on the scale which has provision for automatically adjusting the rate of supply of material during the formation of a load according to whether a predetermined amount of material has been deposited on the scale in a predetermined time during the weighing of a preceding load.

With these general objects in view and such others as may hereinafter appear, the invention consists in the automatic weighing machine and in the various structures, arrangements and combinations of parts hereinafter described and particularly defined in the claims at the end of this specification.

In the drawings illustrating the preferred embodiment of the invention, Fig. 1 is a side elevation partly in cross-section, of the material feeding and weighing mechanisms of a multiple unit automatic weighing machine embodying the present invention; Fig. 2 is a plan view on the line 2—2 of Fig. 1 of control mechanism to be referred to; Fig. 3 is a view similar to Fig. 1 with the scale beam omitted and showing the parts in a different position of operaiton; Fig. 4 is a detail view in side elevation of control mechanism for adjusting the feed gate of the feeding mechanism; Figs. 5 and 6 are end views looking from the left and right respectively of Fig. 4; and Figs. 7 and 8 are detail views showing a pawl and ratchet clutch forming part of the control mechanism shown in Fig. 4 in different positions of operation.

In general, the present invention contemplates a weighing machine embodying a scale and material feeding mechanism for forming a load on the scale, and in which provision is made for automatically adjusting the rate of supply of material during the formation of a load according to whether a predetermined amount of material has been deposited on the scale in a predetermined time during the weighing of a preceding load. The weighing machine may and preferably will embody feeding mechanism for feeding the material in a bulk and a drip stream and also control mechanism for adjusting the bulk stream for the purpose above set forth. The invention finds particular utility in a multi-unit weighing machine of the type operating in cycles under the control of a one revolution clutch or equivalent mechanism and for purposes of illustration, the invention will be described as embodied in such a multi-unit weighing machine. The present multi-unit weighing machine, except as to details hereinafter described, may and preferably will comprise the weighing machines of the same general type as illustrated and described in the United States patents to Howard, No. 2,151,107, March 21, 1939 and No. 2,207,885, July 16, 1940, to which reference may be made. Such prior weighing machines are provided with individual weighing units each comprising a scale including a scale beam, material feeding mechanism, and means controlled by the scale beam for terminating the feed of material when a predetermined weight is reached. Provision has also been made in such prior machines for resetting the control mechanism and for initiating the feed of the material to begin another cycle of operation. The resetting mechanism is actuated by means including a cam mounted on a cam shaft arranged to be rotated through a one revolution clutch.

Each scale unit is independently operated, that is, all are permitted to start their weighing operation at the same time but each is permitted to trip to terminate the feed of the material when its individual weight is reached. Thus, in operation, the scales trip at varying times depending upon the rate of feed for each individual scale unit. Provision has also been made for preventing the rotation of the cam shaft to simultaneously reset all of the units until all of the scales have completed their weighing operation.

Thus, in the operation of such prior automatic weighing machines it will be seen that the rate of operation of the slowest of the several scale units in completing its weighing operation determines the production capacity or speed of operation of the entire multiple unit machine. In commercial operation, the rate of rotation of the cam shaft or the time required in completing one revolution of the cam shaft is such that in normal operation all of the scale units should have completed their weighing operations before the cam shaft comes to rest. In other words, in normal operation all the scales will have tripped within such predetermined time (the time it takes for the cam shaft to make one revolution), so that the one revolution clutch will have been rendered ineffective to stop the cam shaft and in effect the cam shaft is continuously rotated to obtain maximum efficiency in the operation of the machine.

In determining the above described normal operating conditions of such prior machines, the machine is designed so that the rate of feed of the material, the time required for the cam shaft to make one revolution and other conditions, are such that a predetermined load may be weighed with reasonable accuracy. For example, if the rate of feed or stream of material is adjusted to feed a relatively large stream of material, the impact force of such material falling on the scale would be likely to trip the scale prematurely resulting in an inaccurate final weight. On the other hand, if the stream of material is adjusted to feed a relatively small stream of material, the time required to reach a predetermined weight would be such as to abnormally slow down the productive capacity of the machine. Hence, in order to achieve accurate and efficient automatic weighing, it is desirable that the stream of material be adjusted so as to effect tripping of the scale within a predetermined maximum time, and also to prevent premature tripping of the scale. Heretofore, it has been attempted to effect such operating conditions by manual adjustment of the individual feed streams for each scale. However, such conditions have heretofore been difficult to obtain, depending to some extent upon the skill of the operator; upon variations in the weight per volume or the weight per geometric size of the stream; and also upon the degree of sensitiveness of the materials being weighed to variations in atmospheric conditions, and as a result, constant vigilance by the operator has been required to make the necessary and above described manual adjustments, so that production time has been lost, or inaccurate weighing has resulted.

In accordance with the present invention, provision is made for automatically regulating the stream of the material fed onto the individual scale beams of a multi-unit weighing machine during a succeeding cycle in the operation of the machine in accordance with the time required for the stream being fed to deposit a predetermined weight of material onto the scale, in order that each weighing unit may effect accurate weights within a predetermined maximum time. Thus, if in operation, a predetermined weight is reached and an individual scale trips in advance of a predetermined point in the cycle of the operation of the machine, an indication is made that the stream of material being fed is too large to produce substantially accurate weights, and thereupon the stream is automatically adjusted so that during a succeeding cycle of operation, the stream will be reduced in volume or fed at a slower rate. If, on the other hand, the predetermined weight is reached after such predetermined time in the cycle of operation of the machine, an indication is made that the stream is being fed too slowly so as to preclude maximum operating efficiency of the machine, and thereupon the stream is automatically adjusted to increase the rate of feed during a succeeding cycle of operation, thus tending to maintain a stream of material flowing at a maximum rate consistent with accurate weighing operation. As a result, all of the scales will trip within the time allotted for a single cycle in the operation of the machine so that delay is not occasioned by having to wait for a slowly operating scale as in the usual weighing machine, enabling the cam shaft to be rotated continuously during the operation thereof.

Referring now to the drawings, Fig. 1 illustrates one of a plurality of similar units of a multiple unit automatic weighing machine in which 10 represents a scale beam mounted on knife edges 12 secured in a bracket 14 attached to the machine frame. The weighing end of the scale beam may be provided with a receptacle 16 and the other end provided with the usual counterweight 18.

The material feeding mechanism includes a supply hopper 20 from which material is permitted to flow by gravity through a feed controlling and material accumulating chamber 22 and into the receptacle 16 during the weighing operation.

In the preferred embodiment of the invention, provision is made for feeding a relatively large or bulk stream of material during the first part of the weighing cycle and for feeding a relatively small or drip stream during the latter part of the weighing cycle in order to minimize to some extent the impact force upon the scale beam caused by the falling material thus enabling substantially accurate weights to be made.

As herein shown, the mechanism for controlling the stream of material and for changing the stream from bulk to drip size during the weighing operation comprises a manually adjustable gate 24 and a cam operated gate 26 each mounted in cooperative relation adjacent the throat of the supply hopper, and which are arranged to extend through openings 25, 27 respectively in the sides of the chamber 22. The manually adjustable gate 24 is carried by an arm 28 pivotally mounted on a pin 30 journaled in bearings 32 mounted on one side of the chamber 22. A spring 34 connected to the arm 28 tends to rock the gate 24 inwardly and a stop screw 36 extending through a threaded member 38 swivelly mounted intermediate the ends of the arm 28 is provided to limit the movement of the gate inwardly. One end of the stop screw 36 is arranged to bear against an angular lug 40 on the side of the chamber 22 and the other end of the screw is provided with a hand wheel 42 by which the screw may be rotated to adjust the position of the gate 24.

The opening between the gates 24, 26 determines the size of the stream delivered to the scale and as above stated provision is made for changing the stream from a bulk to a drip size during the weighing operation. When the cam operated gate 26 is moved to its maximum inward position, as illustrated in Fig. 3, the opening between the gates forms the drip stream 45. It will be apparent that the size of the drip stream may be controlled by adjusting the gate 24 with relation to the maximum inward position of the gate 26. When the gate 26 is in its outwardly rocked position as illustrated in Fig. 1, the opening between the gates forms the bulk stream 50. In the illustrated machine and in accordance with the present invention, provision is made for automatically changing the size of the bulk stream 50 with relation to the time required for the load in the receptacle 16 to reach a predetermined weight by limiting the outwardly rocked position of the cam operated gate 26, as will be hereinafter described.

Referring now to Figs. 1 and 2, the cam operated gate 26 is carried on an arm 52 which is mounted fast on a shaft 54 journaled in bearings 56 extending from the opposite side of the chamber 22. The gate 26 is arranged to be rocked from the position shown in Fig. 1 to the position shown in Fig. 3 by a cam 58 mounted on a cam shaft 60 through connections including a cooperating cam roller 62 carried by a lever 64, a connecting rod 66, and a lever 68 secured to the shaft 54 upon which the arm 52 is mounted. The cam lever 64 is pivotally mounted on a stationary shaft 70 and a spring 72 connected to the lever is arranged to urge the lever in a direction such as to cause the cam roll to follow its cam. The cam 58 is designed to permit a bulk stream to flow for a predetermined time in the cycle of operation of the machine and to permit the drip stream to flow for the remainder of the weighing operation. However, it will be understood that the low spot 74 of the cam 58 merely determines the maximum outward position of the gate 26, provision being made as hereinbefore stated, for varying such outwardly rocked position of the cam operated gate.

As illustrated in Figs. 1 and 2, the mechanism for limiting the outward movement of the gate 26, and consequently varying the size of the bulk stream 50, includes a spirally formed cam or limiting stop 75 mounted on a shaft 78. A roller 80 adjustably mounted in a lever 82 is arranged to cooperate with the cam stop 75. The lever 82 is pivotally mounted on a shaft 84 and is connected by a link 85 to the arm 52 mounted fast on the shaft 54. With this construction, it will be seen that when the gate 26 is rocked by the cam 58 through the connections described, the linkage 82, 85, 52 is also rocked since the arm 52 is fast on the shaft 54. It will also be seen that when the roller 80 engages the cam stop 75 further movement of the gate arm 52 in an outward direction is prevented thus limiting the size of the bulk stream 50. During this time the roller 62 will be held away from the low spot 74 of the cam 58. Provision is made for changing the position of the spirally formed stop member 75 on the shaft 78 in order to vary the size of the bulk stream, as will be hereinafter described.

In the illustrated embodiment of the invention, provision is made for terminating the feed of the material when the load in the receptacle has reached a predetermined weight through connections controlled by the scale beam 10. As herein shown, the lower end of the chamber 22 is provided with a pair of pivotally mounted shutters 90, 92 arranged to be simultaneously opened at the beginning of each cycle of operation, and to be closed by a tripping mechanism actuated by connections from the scale beam when the scale beam has made its weight.

As herein shown, the tripping mechanism comprises a trip lever 94 pivotally mounted on the stationary shaft 70. One arm 96 of the trip lever is connected by a rod 98 to a link 100 connected to arms 102, 104 of the shutters 90, 92. The trip lever is urged in a counterclockwise direction viewing Fig. 1 by a spring 106 connected to a second arm 108 of the lever 94. Provision is made for locking the trip lever in the position illustrated in Fig. 1 to permit the shutters 90, 92 to remain open during the weighing operation, and as herein shown, the upper end of the lever 94 is provided with a hardened steel plate 110 arranged to engage a roller lock 112. The roller lock is mounted upon one end of a pivoted lever 114 the second end of which is provided with the movable member 116 of a standard form of electromagnet indicated at 118 arranged to hold the trip lever 94 in its locked position when the electromagnet is energized. As diagrammatically illustrated in Fig. 3, the electromagnet 118 is energized through leads 120, 122 the latter being connected through contacts 124, 126 arranged to be opened by movement of the scale beam when the predetermined weight is reached. With this construction it will be seen that when the load in the receptacle has reached a predetermined weight, the electromagnet 118 will be deenergized, releasing the armature 116 and permitting the trip lever to be rocked in a counterclockwise direction by the spring 106 as shown in Fig. 3 to close the shutters 90, 92. The trip lever 94 is limited in its movement in a counterclockwise direction by a stop screw 93 adjustably carried in the end of arm 108 and which is arranged to engage an abutment 97 attached to the machine frame.

Provision is made for resetting the trip lever 94 in its locked position to open the shutters 90, 92 and to start another cycle of operation. As herein shown, the trip lever 94 is provided with a cam roller 130 arranged to be engaged by a cam 132 fast on the cam shaft 60 at the beginning of a new weighing cycle.

From the description thus far, it will be observed that in the operation of the machine at the beginning of each cycle of operation, the resetting cam 132 operates to open the shutters 90, 92 to permit a stream of material to flow into the receptacle 16 and that during the first portion of the cycle of operation, the cam 58 is arranged to permit the gate 26 to be opened to feed a bulk stream. After a predetermined time in the cycle, the cam 58 operates to rock the gate 26 inwardly to change the bulk stream to a drip stream and the drip stream continues to flow into the receptacle until a predetermined load has been deposited therein, whereupon the scale is tripped to release the trip lever 94 terminating the flow of material into the receptacle. During the remainder of the cycle, the material may continue to flow into the chamber 22 in order to accumulate a partial load to be deposited into the receptable at the next succeeding cycle.

As hereinbefore stated, each cycle unit of the multiple unit weighing machine is independently operated so that the length of time for each scale to make its weight will vary according to the rate of flow of the material. The usual provision, not shown, for preventing the weighing machine from making another cycle of operation until all the scales have made their weight may be provided, as fully illustrated and described in the aforesaid Howard patents, and which may comprise connections to and a one revolution clutch. The usual provision is also made for simultaneously releasing the weighed loads in the receptacles to deposit the material into containers positioned therebeneath. As herein shown, each receptacle 16, is provided with a pair of shutters 134, 136 arranged to be opened by a cam, not shown, through connections including the linkage indicated generally at 138.

Referring now to Figs. 1 and 3, the mechanism for automatically regulating the size of the bulk stream 50 in order that the scales may weigh a predetermined amount of material in a predetermined time includes mechanism for changing the position of the spirally formed stop member 75. First, it will be understood that the cam shaft 60 is rotated at a rate of speed such as to allow ample time for the weighing operation to be completed and to produce substantially accurate weights in less than one revolution of the cam shaft. A portion of the cycle of rotation of the cam shaft is utilized for releasing the loads in the receptacles and for resetting the trip lever 94 and in practice, such portion amounts to approximately one-third of a revolution of the cam shaft leaving about two-thirds of a revolution for the weighing operation. In operation, the stream adjusting mechanism is arranged to increase the size of the stream if the scale is tripped after the cam shaft 60 has rotated two-thirds of a revolution, and to decrease the size of the stream if the scale is tripped before the shaft has rotated two-thirds of a revolution, thereby tending to approach a condition in which each scale unit will perform its weighing operation within a predetermined time limit, such time limit being substantially the minimum time consistent with producing accurate weights, and also tending to synchronize the weighing time of all the weighing units.

As herein shown, the spirally formed stop cam 75 is loosely mounted on the shaft 78 and is arranged to be held in its adjusted position by a friction clamp or brake 140 embracing one hub 142 of the stop cam. The second hub 144 of the stop cam is provided with a flange 146 to which is secured two ratchets 148, 150 having teeth cut in opposing directions. A two-armed pawl carrier 152 fast on the shaft 78 is provided with one spring-pressed pawl 154 arranged to cooperatively engage the ratchet 148 and a second spring-pressed pawl 156 arranged to cooperatively engage the ratchet 150. Provision is made for rocking the shaft 78 in order to permit the pawls to engage their respective ratchets to effect adjustment of the cam stop in one direction or the other. As herein illustrated, the shaft 78 is arranged to be rocked by a cam 158 through connections including a cooperating cam roll 160 carried by a lever 162 pivotally mounted on the shaft 70, a connecting rod 164, and an arm 165 fast on the shaft 78. A spring 161 serves to hold the roll 160 against its cam. The cam 158 is provided with a depression 168 at a point in the cycle of operation corresponding to approximately two-thirds of a revolution with relation to the beginning of the weighing operation. In operation, the two-armed pawl carrier is rocked first in one direction and then back to its original position. Provision is made for rendering one of the pawls ineffective to rotate the cam stop 75 depending upon whether the scale has tripped before or after the roller 160 has fallen into the depression 168 of the cam 158.

As illustrated in Figs. 1 and 5, a shield 170 loosely mounted on a shaft 78 adjacent the pawl carrier 152 is arranged to cooperate with pins 172, 174 extending from the pawls 154, 156 respectively to remove the pawls from engagement with their respective ratchets. The shield is arranged to be rocked on the shaft 78 from a position in engagement with the pin 174 holding the lower pawl 156 out of engagement with its ratchet 150, to a position in engagement with the pin 172 holding the upper pawl 154 out of engagement with its ratchet 148 by a connection to the trip lever 94 comprising a connecting rod 176.

With this construction it will be observed that if, when the pawl carrier 152 is rocked by the cam 158, the scale has not yet made its weight, indicating that the stream is not adjusted to feed a load great enough to complete the weighing operation within the predetermined time limit, the shield 170 will remain in the position shown in Fig. 7, that is, in a position to hold the lower pawl 156 out of engagement with its ratchet, and consequently, the upper pawl 154 will be permitted to rock its ratchet 148 in a counterclockwise direction, viewing Figs. 1 and 7, to rotate the cam stop 75 into a position such as to increase the bulk stream for the next succeeding cycle of operation.

Conversely, when the pawl carrier 152 is rocked by the cam 158, if the lever 94 has already tripped indicating that the stream is adjusted to feed a weighed load faster than consistent with accurate weighing operation, the shield 170 will be rocked to the position shown in Fig. 8, that is, in a position to hold the upper pawl 154 out of engagement with its ratchet, and consequently, the lower pawl 156 will be permitted to rock its ratchet 150 in a clockwise direction viewing Figs. 1 and 8 to rotate the cam stop 75 into a position such as to decrease the bulk stream for the next succeeding cycle of operation.

From the above description it will be seen that in operation, the feeding stream is constantly being corrected to maintain the weighing time substantially constant so as not to exceed a predetermined time limit and also so as to insure that the weighing time is not cut down below such predetermined time. Thus, the weighing machine is enabled to operate with maximum efficiency and expediency, the cam shaft being permitted to rotate continuously since, when all the weighing operations are completed within the predetermined time limit, the one revolution clutch is rendered ineffective to stop the machine although, in practice, the one revolution clutch drive is retained in order to take care of conditions where a particular scale unit might be inadvertently delayed because of an obstruction in the feed hopper, depletion of material in the hopper, or other like causes. The present construction also tends to prevent any one scale unit from delaying the operation of the machine by insuring a stream sufficient to complete the weighing operation within a predetermined time.

While the preferred embodiment of the invention has been herein illustrated and described as embodied in a multi-unit weighing machine, it will be understood that the invention may be embodied in other forms and types of weighing machines within the scope of the following claims.

Having thus described the invention, what is claimed is:

1. In an automatic weighing machine of the type operating in cycles, in combination, a scale including a scale beam, material feeding means for feeding a stream of material onto said scale beam, operating mechanism including a cam shaft arranged to make one revolution during each cycle of operation, control mechanism operatively connected with said scale beam to cut off the flow of said stream when a predetermined weight is reached, said feeding means and said scale beam being initially adjusted to permit said predetermined weight to be reached within a predetermined portion of said cycle, and means operatively connected to said cam shaft for automatically adjusting said stream to increase the rate of feed thereof in the event that said predetermined weight is reached after said predetermined portion of a cycle.

2. In an automatic weighing machine of the type operating in cycles, in combination, a scale including a scale beam, material feeding means for feeding a stream of material onto said scale, operating mechanism including a cam shaft arranged to make one revolution during each cycle of operation, control mechanism operatively connected with said scale beam to cut off the flow of said stream when a predetermined weight is reached, said feeding means and said scale beam being initially adjusted to permit said predetermined weight to be reached within a predetermined portion of said cycle, and means operatively connected to said cam shaft for automatically adjusting said stream to decrease the rate of feed in the event that said predetermined weight is reached prior to said predetermined portion of a cycle of operation of the machine.

3. In an automatic weighing machine of the type operating in cycles, in combination, a scale including a scale beam, material feeding means for feeding a stream of material into said scale, operating mechanism including a cam shaft arranged to make one revolution during each cycle of operation, control mechanism operatively connected with said scale beam to cut off the flow of said stream when a predetermined weight is reached, said feeding means and said scale beam being initially adjusted to permit said predetermined weight to be reached within a predetermined portion of said cycle, and means operatively connected to said cam shaft for automatically adjusting the volume of the stream to increase or decrease the rate of feed according to whether said predetermined weight is reached after or before said predetermined portion of a cycle of operation of the machine.

4. An automatic weighing machine of the type operating in successive cycles, having in combination, a scale including a scale beam, material feeding means for feeding a stream of material onto said scale, means for changing the stream from a bulk stream to a drip stream during each cycle as the weighing progresses, operating mechanism including a cam shaft arranged to make one revolution during each cycle of operation, control mechanism operatively connected with said scale beam to cut off the flow of material when a predetermined amount has been fed, said material feeding means and said scale beam being initially adjusted to permit said predetermined weight to be reached within a predetermined portion of said cycle, and means controlled by said cam shaft operative during one cycle for automatically adjusting said bulk stream to increase or decrease the rate of feed for a subsequent cycle of operation according to whether said predetermined amount is fed after or before said predetermined portion of said one cycle of operation.

5. In an automatic weighing machine of the type operating in cycles, in combination, a scale including a scale beam, material feeding mechanism for feeding a stream of material onto said scale, operating mechanism including a cam shaft arranged to make one revolution during each cycle of operation, control mechanism operatively connected with said scale beam for terminating the feed of material onto the scale when a predetermined weight is reached, and means operatively connected to said cam shaft for automatically regulating the volume of said stream to feed said predetermined weight of material onto said scale during a predetermined time in a cycle of operation.

6. In an automatic weighing machine of the type operating in successive cycles, in combination, a scale including a scale beam, material feeding mechanism for feeding a stream of material onto said scale during each cycle, operating mechanism including a cam shaft arranged to make one revolution during each cycle of operation, control mechanism operatively connected with said scale beam for cutting off the flow of material when a predetermined weight is reached during each cycle, said feeding mechanism and said scale beam being initially adjusted to permit said predetermined weight to be reached within a predetermined portion of said cycle, and means controlled by said cam shaft operative during one cycle of operation for automatically regulating said stream during a subsequent cycle to feed said predetermined weight of material onto said scale during a subsequent cycle in the event the weighing time varies from said initial adjustment.

7. An automatic weighing machine of the type operating in successive cycles having, in combination, a scale including a scale beam, material feeding means provided with a valve for controlling the feeding of a stream of material onto the scale, operating mechanism including a cam shaft arranged to make one revolution during each cycle of operation, control means operatively connected with said scale beam to cut off the flow of said stream when a predetermined weight is reached during each cycle, said valve and said scale beam being initially adjusted to permit said predetermined weight to be reached within a predetermined portion of said cycle, and means controlled by said cam shaft operative during one cycle for automatically adjusting said valve to increase or decrease the rate of feed for a subsequent cycle of operation according to whether said predetermined weight was reached after or before said predetermined portion of said one cycle of operation.

8. An automatic weighing machine of the type operating in successive cycles having, in combination, a scale, an adjustable gate adapted to control the feed of a stream of material onto said scale, operating mechanism including a cam shaft arranged to make one revolution during each cycle of operation, control means operatively connected with said scale to cut off the flow of said stream when a predetermined weight is reached, a stop member for said gate arranged to limit the size of said stream, said gate and said scale being initially adjusted to permit said predetermined weight to be reached within a predetermined portion of said cycle, and means mounted on said cam shaft and operatively connected to said stop member operative during one cycle of operation for automatically adjusting said stop to increase or decrease the rate of feed for a subsequent cycle of operation according to whether said predetermined weight was reached after or before said predetermined portion of a cycle of operation.

9. An automatic weighing machine of the type operating in successive cycles having, in combination, a scale including a scale beam, material feeding means having an adjustble gate for controlling the feed of a stream of material onto said scale, control means including a trip lever operatively connected with said scale beam to cut off the flow of said stream when a predetermined weight is reached, a stop member for said gate arranged to limit the size of said stream, a cam operated mechanism for automatically adjusting said stop during one cycle of operation to increase or decrease the rate of feed for a subsequent cycle of operation, and means operatively connected with said trip lever for controlling said adjusting mechanism whereby to effect an increase in said feeding rate in the event that said predetermined weight is reached after a predetermined time in a cycle of operation of the machine, and to effect a decrease in said feeding rate in the event that said weight is reached prior to said predetermined time.

10. In a weighing machine, in combination, a weighing scale, material feeding means for forming a load on said scale including means for terminating the flow of material upon the scale when a predetermined weight is reached, operating mechanism including a cam shaft arranged to make one revolution during each cycle of operation, said feeding means and said scale being initially adjusted to permit a predetermined weight to be reached within a predetermined portion of said cycle, and control mechanism operatively connected to said cam shaft for subsequently automatically adjusting the feeding means in the event that the weighing time varies from said initial adjustment.

STANLEY R. HOWARD.